(12) United States Patent
Masuda (10) Patent No.: US 7,395,796 B2
(45) Date of Patent: Jul. 8, 2008

(54) ROTATIONAL BALANCE ADJUSTING STRUCTURE AND METHOD FOR ENGINE

(75) Inventor: Michihiko Masuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/826,138

(22) Filed: Jul. 12, 2007

(65) Prior Publication Data

US 2008/0017157 A1 Jan. 24, 2008

(30) Foreign Application Priority Data

Jul. 18, 2006 (JP) .............................. 2006-195437

(51) Int. Cl.
  *F02B 75/06* (2006.01)
(52) U.S. Cl. .................... 123/192.1; 464/90; 29/901
(58) Field of Classification Search ............. 123/192.1; 74/574.4; 464/90; 29/901
See application file for complete search history.

(56) References Cited

U.S. PATENT DOCUMENTS 2,961,894 A * 11/1960 Oles ........................ 74/574.4

2006/0236796 A1 10/2006 Harada

FOREIGN PATENT DOCUMENTS

| JP | 63-246564 | 10/1988 |
|----|-----------|---------|
| JP | 10-47435 | 2/1998 |
| JP | 2002-147533 | 5/2002 |
| JP | 2006-275111 | 10/2006 |

* cited by examiner

*Primary Examiner*—Noah P. Kamen
(74) *Attorney, Agent, or Firm*—Finnegan, Henderson, Farabow, Garrett & Dunner, LLP (57) ABSTRACT

A rotational balance adjustment structure for an engine includes; a damper pulley having an elastic member provided on the outer periphery of a hub and a damper mass provided on the outer periphery of the elastic member; and an engine assembly having an engine body and a plurality of parts mounted on the engine body, the plurality of parts including the damper pulley. The engine assembly is assembled by mounting a plurality of parts to the engine body, the plurality of parts including the damper pulley, and the rotational balance of the engine assembly is adjusted by attaching a balance piece to the damper mass.

9 Claims, 13 Drawing Sheets

ROTATIONAL BALANCE ADJUSTING STRUCTURE AND METHOD FOR ENGINE

INCORPORATION BY REFERENCE

The disclosure of Japanese Patent Application No. 2006-195437 filed on Jul. 18, 2006 including the specification, drawings and abstract is incorporated herein by reference in its entirety.

BACKGROUND OF THE INVENTION

1. Field of the Invention

The invention relates to a structure and a method for adjusting the rotational balance of a rotational-part assembly consisting of a plurality of parts including a crankshaft and a damper pulley in an engine having an engine body on which the damper pulley is mounted together with other parts.

2. Description of the Related Art

An engine body mounted in a motor vehicle, or the like, includes pistons that are disposed in cylinders formed in the cylinder body such that the pistons can reciprocate therein. The pistons are connected to the crankshaft, which is the output shaft of the engine, via connecting rods. The cylinder head is provided on the upper end of the cylinder block, and combustion chambers are defined between the cylinder head and the respective pistons. The pistons reciprocate as air-fuel mixtures are combusted in the combustion chambers, and the reciprocation of the pistons turns the crankshaft via the connecting rods.

Various parts are mounted on the engine body, such as a damper pulley attached to the front end of the crankshaft and a flywheel attached to the rear end of the crankshaft. In this specification, an assembly obtained by mounting such parts including the damper pulley and the flywheel to the engine body will be referred to as "engine assembly".

Among the parts mounted on the engine body, the damper pulley is a pulley that has a damping function, as well as the function for transmitting the rotational force from the crankshaft to auxiliaries, such as those in a motor vehicle (e.g., compressor for air-conditioner, power steering pump). For example, Japanese Patent Application Publication No. 63-246564 (JP-A-63-246564) describes the aforementioned technology.

Figure 13:
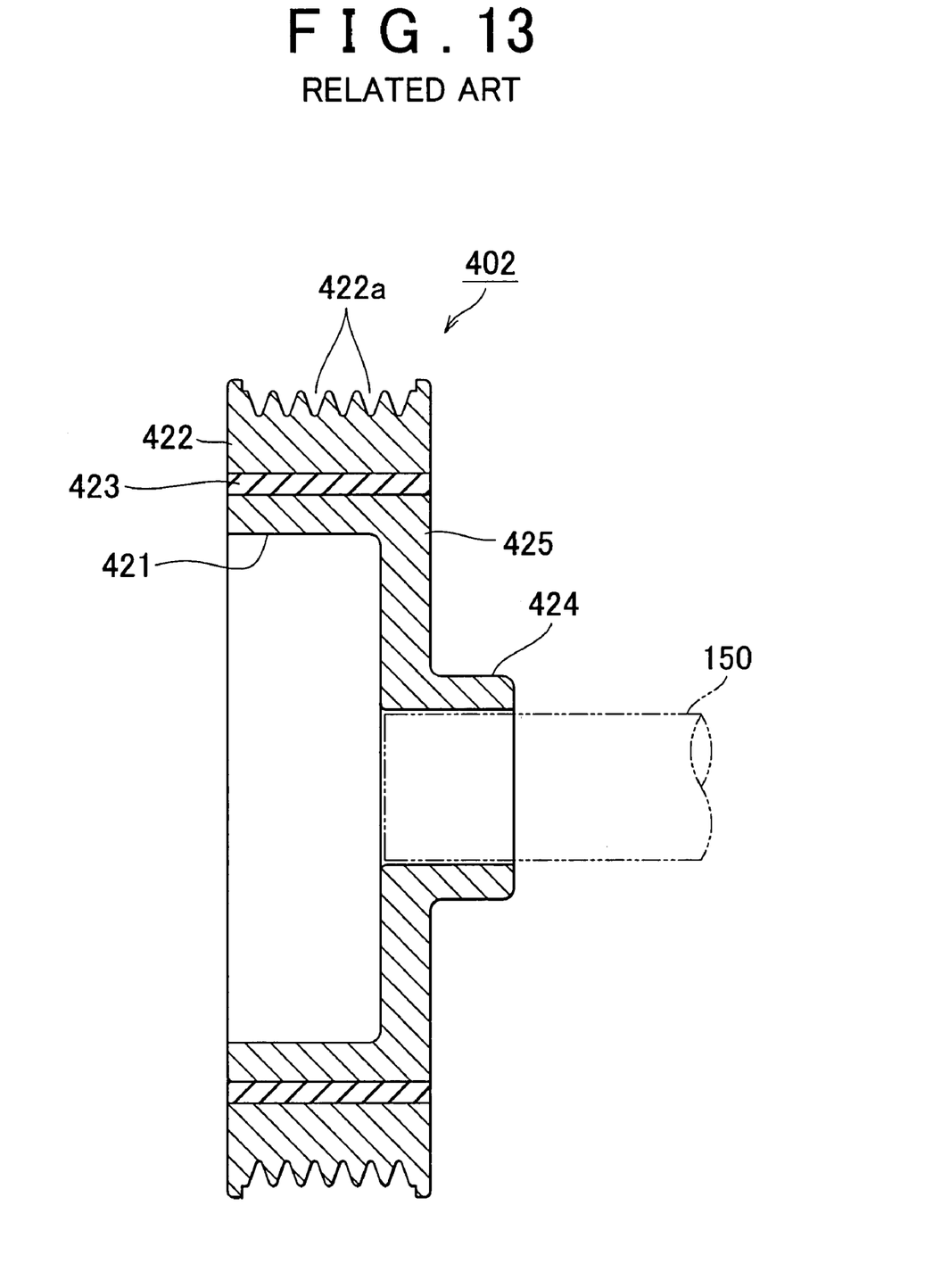
FIG. 13 is a vertical cross-sectional view showing the structure of a related-art damper pulley.

An example of a damper pulley is shown in FIG. 13. The damper pulley 402 of this example has a cylindrical hub 421 that is connected to a crankshaft 150 via arms 425 and a boss 424, a damper rubber 423 provided on the outer periphery of the hub 421, a cylindrical damper mass 422 provided on the outer periphery of the damper rubber 423. According to this structure, when the crankshaft 150 is rotating, the hub 421 and the damper mass 422 resonate with the damper rubber 423 interposed therebetween and this resonance cancels the torsional vibration of the crankshaft 150, so that the vibration of the crankshaft 150 is damped. Also, in this damper pulley 402, V-grooves 422a are formed in the outer surface of the damper mass 422 and the belt for driving the auxiliaries, such as the air conditioner compressor and the power steering pump, is wound around the damper pulley 402 by being fit on the V-grooves 422a.

Typically, the rotational balance of a rotational-part assembly consisting of a plurality of parts that are mounted on the engine body (e.g., damper pulley, flywheel, crankshaft) is adjusted by adjusting the rotational balance of each part. Therefore, to obtain a desired rotational balance of the engine assembly, the rotational balance of each part needs to be finely adjusted. Also, even if a desired rotational balance of each part constituting the rotational-part assembly can be obtained, the rotation of the rotational-part assembly mounted on the engine assembly may be out of balance due to, for example, the tolerances for attaching the respective parts to the crankshaft.

SUMMARY OF THE INVENTION

In view of the above, the invention has been made to provide a structure and a method for adjusting the rotational balance of a rational-part assembly consisting of a plurality of parts including a crankshaft and a damper pulley without finely adjusting the rotational balance of each part.

A first aspect of the invention relates to a rotational balance adjustment structure for an engine including: a damper pulley having an elastic member provided on the outer periphery of a hub and a damper mass provided on the outer periphery of the elastic member; an engine assembly having an engine body and a plurality of parts mounted on the engine body, the plurality of parts including the damper pulley; and a balance piece that is detachably attached to the damper mass to adjust the rotation balance of the engine assembly.

A second aspect of the invention relates to a rotational balance adjusting method for an engine, wherein assembling an engine assembled by mounting a plurality of parts to an engine body, the plurality of parts including a damper pulley having an elastic member provided on the outer periphery of a hub and a damper mass provided on the outer periphery of the elastic member; and adjusting the rotational balance of the engine assembly by attaching a balance piece to the damper mass.

Note that "a plurality of parts (constituting the rotational-part assembly)" represent the parts that are mounted on the engine body and rotate together with the crankshaft (including the damper pulley).

According to the invention, because the balance piece is attached to the damper mass provided on the outer periphery of the elastic member of the damper pulley, the impact force that arises when attaching the balance pierce to the damper mass can be absorbed by the elastic member, and this eliminates the possibility of the respective parts of the engine body being damaged when attaching the balance piece. Further, because the elastic member is provided between the hub and the damper mass, for example, when the crankshaft is rotating, the hub and the damper mass resonate with the elastic member interposed therebetween and this resonation cancels the torsional vibration of the crankshaft, so that the vibration of the crankshaft is damped.

Further, according to the invention, the engine assembly is first assembled by mounting the parts including the damper pulley to the engine body, and then the rotational balance of the rotational-part assembly mounted on the engine assembly is adjusted by attaching the balance piece to the damper mass. Therefore, the rotational balance of the rotational-part assembly, which consists of the respective parts including the crankshaft and the damper pulley, can be made appropriate without finely adjusting the rotational balance of each of the parts.

Figure 6:
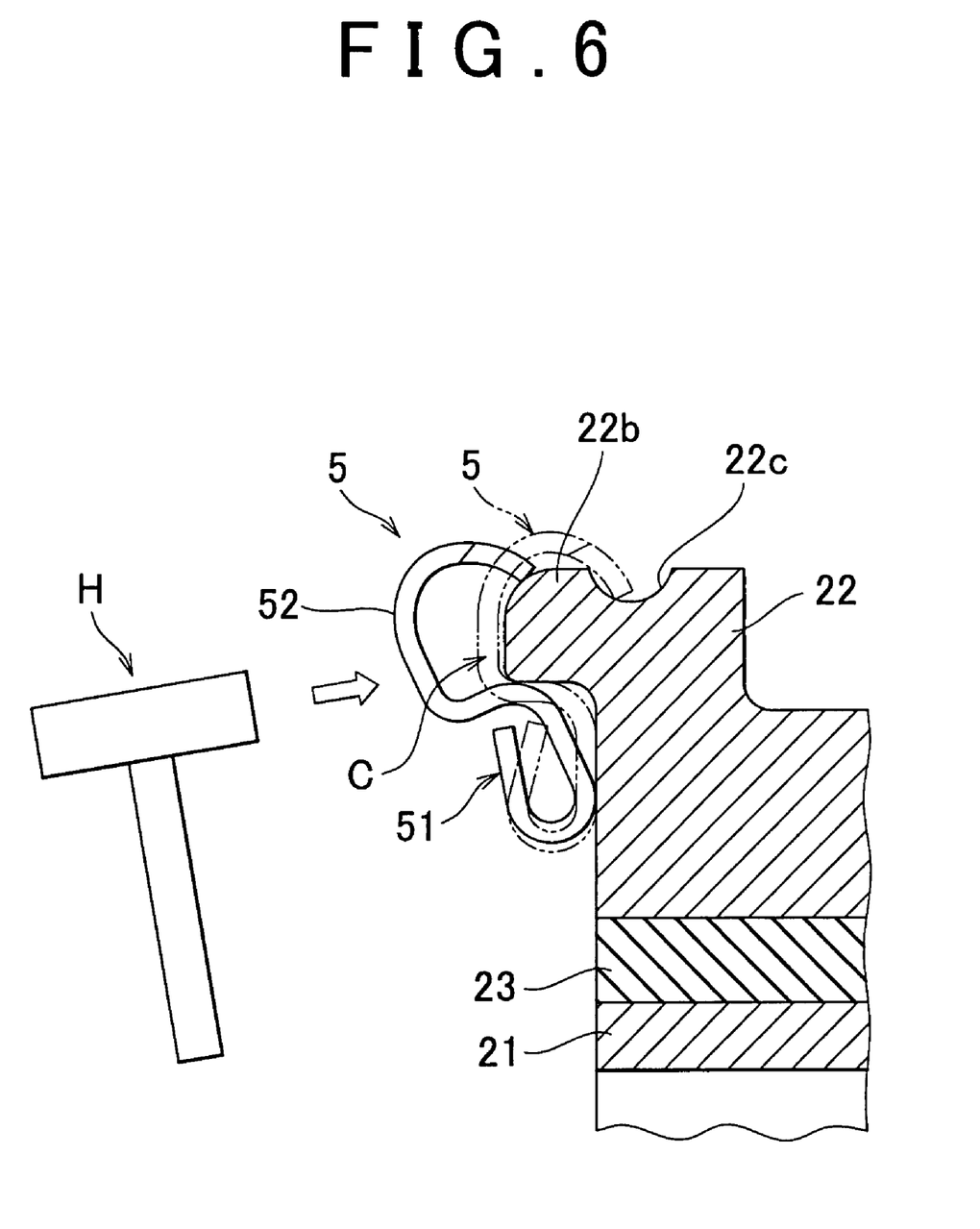
FIG. 6 is a view illustrating the procedure for attaching the balance piece to the damper pulley in the first exemplary embodiment of the invention.

According to the invention, in order to obtain a sufficient gripping force of the balance piece for preventing the balance piece from coming off from the damper mass when the damper pulley is rotating at a high speed, the balance piece is formed by processing a flexible metal plate (steel plate) into a specific shape (See FIG. 4A and FIG. 4B), and the thus formed balance piece is attached to the damper pulley by being tapped thereto (See FIG. 6). When such a balance piece is used, an impact arises when tapping the balance piece. However, in the invention, because the balance piece is attached to the damper mass provided on the outer periphery of the elastic member (damper rubber), the impact force can be absorbed by the elastic member.

According to the invention, as described above, the engine assembly is first assembled by mounting the parts including the damper pulley to the engine body, and then the rotational balance of the rotational-part assembly, which consists of the respective parts including the crankshaft and the dumper pulley, is adjusted by attaching the balance piece to the damper mass provided on the outer periphery of the elastic member of the damper pulley. As such, it is not necessary to make fine adjustments of the rotational balance of each part.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EXEMPLARY EMBODIMENTS

1. First Exemplary Embodiment

Hereinafter, the first exemplary embodiment of the invention will be described with reference to the drawings.

Figure 1:
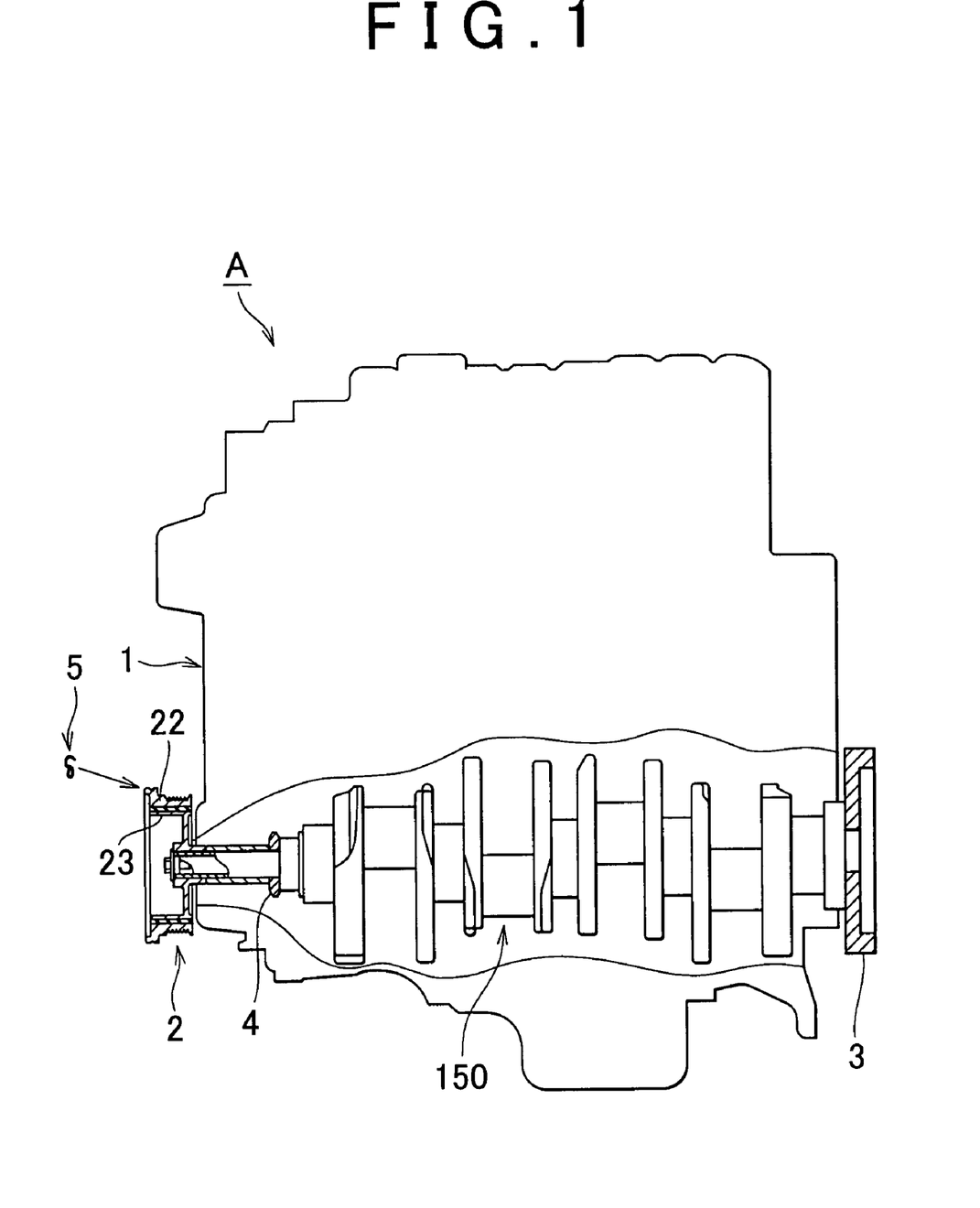
FIG. 1 is a view schematically showing the structure of an engine assembly in the first exemplary embodiment of the invention.

An engine assembly A to which the invention is applied includes an engine body 1, a damper pulley 2 provided at the front end of a crankshaft 150 of the engine body 1, and a flywheel 3 provided at the rear end of the crankshaft 150. A crank sprocket 4 for driving camshafts is provided near the front end of the crankshaft 150. The crank sprocket 4 is one of the parts constituting "rotational-part assembly".

A crank rotor and a drive plate that are used to detect the rotational position and the angular velocity of the crankshaft 150 may be provided in the engine body 1 as components of the engine assembly A.

Next, the structures of the engine body 1 and the damper pulley 2 will be described.

Figure 2:
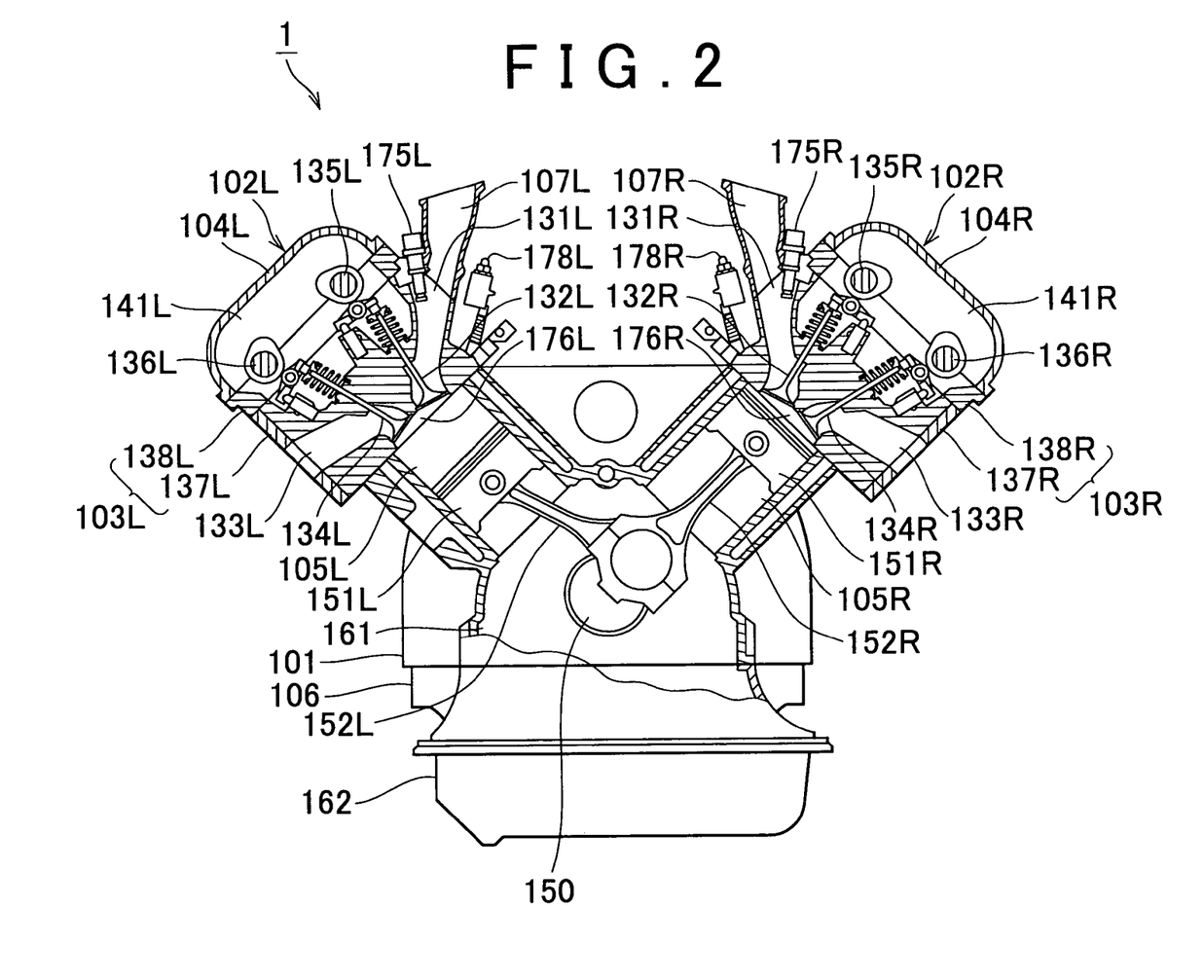
FIG. 2 is a view schematically showing the configuration of the engine body of the engine assembly shown in FIG. 1.

FIG. 2 is a view schematically showing an exemplary configuration of the engine body 1.

The engine body 1 in the first exemplary embodiment is an engine body of a V-eight engine mounted in a motor vehicle. The engine body 1 has a pair of banks (cylinder groups) 102L, 102R that protrude in the form of the letter "V" from the upper side the cylinder block 101. A cylinder head 103L is provided on the bank 102L and a head cover 104L is attached on the upper end of the cylinder head 103L. Likewise, a cylinder head 103R is provided on the bank 102R and a head cover 104R is attached on the upper end of the cylinder head 103R. In the cylinder block 101, the bank 102L involves a plurality of cylinders 105L (e.g., four cylinders 105L) and the bank 102R involves a plurality of cylinders 105R (e.g., four cylinders 105R). The cylinder angle between the cylinders 105L and the cylinders 105R is, for example, 90°. The pistons 151L, 151R are disposed in the respective cylinders 105L, 105R such that the pistons 151L, 151R can reciprocate therein. The pistons 151L, 151R are drivingly connected to the crankshaft 150 via connecting rods 152L, 152R. A crank case 106 is attached to the bottom of the cylinder block 101. The space in the lower area of the cylinder block 101 and the space in the crank case 106 together form a crank chamber 161. An oil pan 162, which is an oil receiving portion, is provided below the crank case 106.

In the first exemplary embodiment, each of the cylinder heads 103L, 103R is a multi-piece cylinder head. That is, the cylinder head 103L is constituted by a cylinder head body 137L that is attached on the upper surface of the cylinder block 101 and a camshaft housing 138L that is attached on the cylinder head body 137L, and the cylinder head 103R is constituted by a cylinder head body 137R that is attached on the upper surface of the cylinder block 101 and a camshaft housing 138R that is attached on the cylinder head body 137R.

In the cylinder head body 137L of the cylinder head 103L, an intake port 131L and an exhaust port 133L are formed for each cylinder 105L. Likewise, in the cylinder head body 137R of the cylinder head 103R, an intake port 131R and an exhaust port 133R are formed for each cylinder 105R. The intake ports 131L, 131R and the exhaust ports 133L, 133R communicate with combustion chambers 176L, 176R, respectively. Spark plugs, which are not shown in the drawings, are disposed at the apexes of the respective combustion chambers 176L, 176R.

Intake valves 132L are provided in the cylinder head body 137L, which open and close the intake ports 131L, and intake valves 132R are provided in the cylinder head body 137R, which open and close the intake ports 131R. On the other hand, exhaust valves 134L are provided in the cylinder head body 137L, which open and close the exhaust ports 133L, and exhaust valves 134R are provided in the cylinder head body 137R, which open and close the exhaust ports 133R. Camshafts 135L, 136L are provided in a cam chamber 141L formed between the camshaft housing 138L and the head cover 104L in the cylinder head 103L. The intake valves 132L open and close as the camshaft 135L rotates, and the exhaust valves 134L open and close as the camshaft 136L rotates. Likewise, camshafts 135R, 136R are provided in a cam chamber 141R formed between the camshaft housing 138R and the head cover 104R in the cylinder head 103R. The intake valves 132R open and close as the camshaft 135R rotates, and the exhaust valves 132R open and close as the camshaft 136R rotates.

An intake manifold 107L is attached to an upper portion of the bank 102L of the cylinder head body 137L on the inner side thereof (the side closer to the bank 102R), and an intake manifold 107R is attached to an upper portion of the bank 102R of the cylinder head body 137R on the inner side thereof (the side closer to the bank 102L). The intake ports 131L communicate with the respective downstream ends of the intake manifold 107L, and the intake ports 131R communicate with the respective downstream ends of the intake manifold 107R. On the other hand, exhaust manifolds, which are not shown in the drawings, are attached to the outer sides of the banks 102L, 102R of the cylinder head bodies 137L, 137R, respectively, and the exhaust ports 133L, 133R communicate with the respective upstream ends of the exhaust manifolds.

A port fuel injector (port fuel injection valve) 175L is provided in the intake port 131L for each cylinder 105L in the cylinder head body 137L, and a port fuel injector 175 R is provided in the intake port 131R for each cylinder 105R in the cylinder head body 137R. When injecting fuel from the port fuel injectors 175L, 175R, the fuel injected from each port fuel injector 175L, 175R is mixed with the air drawn into the intake manifold 107L, 107R, and the air-fuel mixture thus created is then drawn into the combustion chamber 176L, 176R as the intake valve 132L, 132R is opened. In the first exemplary embodiment, further, in-cylinder direct fuel injectors (in-cylinder direction fuel injection valves) 178L, 178R are provided in the cylinder head bodies 137L, 137R, respectively. The in-cylinder direct fuel injectors 178L, 178R directly inject fuel into the respective combustion chambers 176L, 176R.

The port fuel injectors 175L, 175R and the in-cylinder direct fuel injectors 178L, 178R are controlled to inject fuel in various manners. For example, when the engine load is low or medium, in each cylinder 105L, 105R, the port fuel injector 175L, 175R and the in-cylinder direct fuel injector 178L, 178R are both used to inject fuel such that a homogenous air-fuel mixture is created therein in order to improve the fuel economy and reduce emissions. When the engine load is high, conversely, in each cylinder 105L, 105R, only the in-cylinder direction fuel injector 178L, 178R is used to inject fuel so that the intake efficiency improves and knockings are suppressed due to the cooling effect of the intake air. Note that the fuel injection control of the port fuel injectors 175L, 175R and the in-cylinder direct fuel injectors 178L, 178R is not limited to the above.

Figure 3:
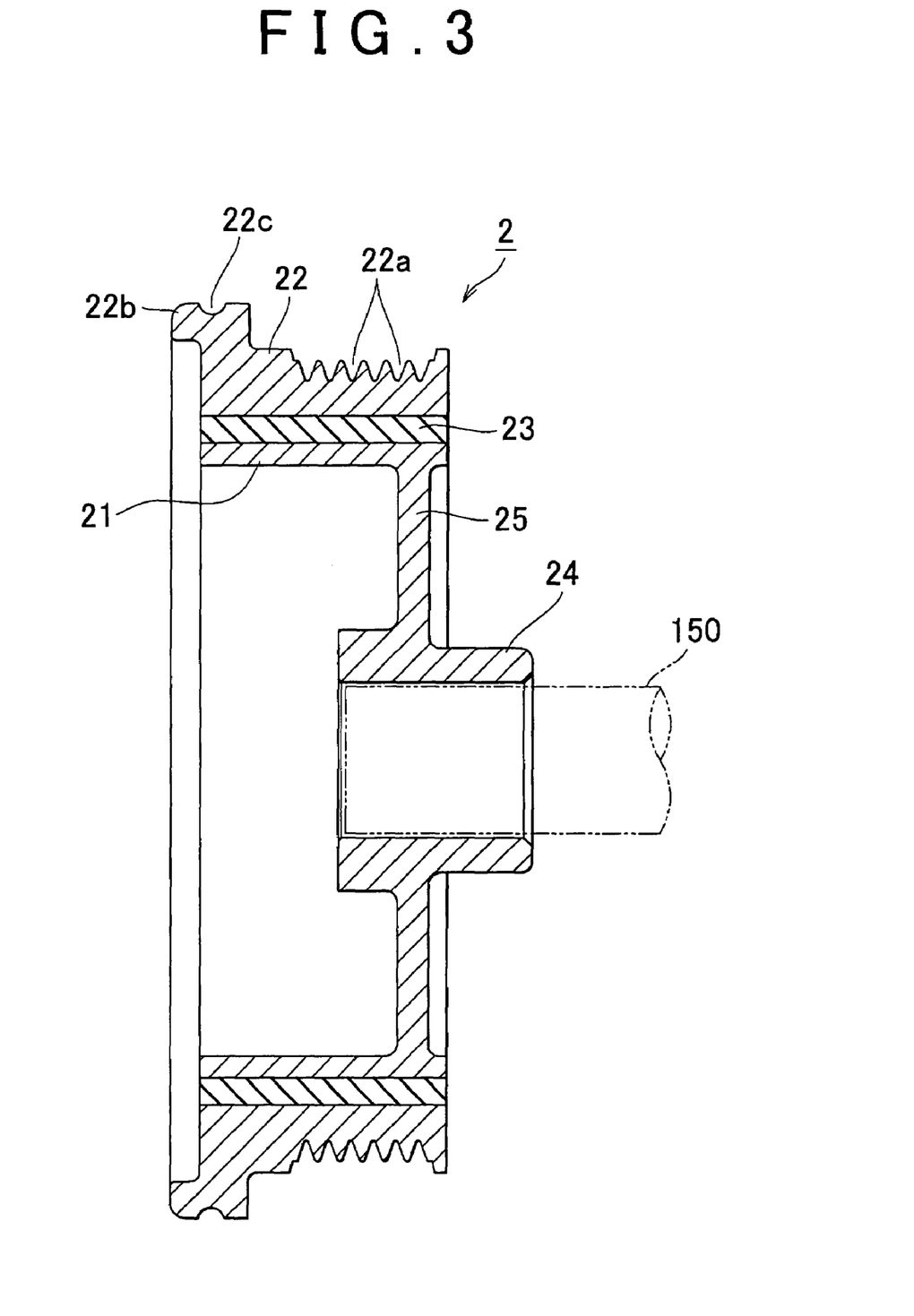
FIG. 3 is a vertical cross-sectional view showing an exemplary structure of the damper pulley in the first exemplary embodiment of the invention.

FIG. 3 is a vertical cross-sectional view showing an exemplary structure of the damper pulley 2 in the engine body 1.

The damper pulley 2 is coupled with the crankshaft 150 of the engine body 1. A belt is wound around the outer periphery of the damper pulley 2, and auxiliaries (e.g., compressor for air-conditioner, power steering pump) are driven by the rotational force transmitted from the rotational shaft of the damper pulley 2 via the belt.

The damper pulley 2 has a cylindrical hub 21, a boss 24 that is connected to the hub 21 via arms 25, a damper rubber (elastic member) 23 that is provided on the outer periphery of the hub 21, a cylindrical damper mass 22 that is provided on the outer periphery of the damper rubber 23. The hub 21 is connected to the crankshaft 150 via the arms 25 and the boss 24. The hub 21, the boss 24, and the arms 25 are integrally formed. The hub 21 and the damper mass 22 are made of cast-iron, for example.

That is, in the damper pulley 2 shown in FIG. 3, the damper rubber 23 is provided between the hub 21 and the damper mass 22. In the outer surface of the damper mass 22 are formed a plurality of V-grooves 22a which extend in the circumferential direction and on which the belt for driving the auxiliaries (e.g., compressor for air-conditioner, power steering pump) is fit. The damper rubber 23 is made of, for example, EPDM rubber (ethylene-propylene-diene monomer rubber).

According to the damper pulley 2 in the first exemplary embodiment, because the damper rubber 23 is provided between the hub 21 and the damper mass 22, when the crankshaft 150 is rotating, the hub 21 and the damper mass 22 resonate with the damper rubber 23 interposed therebetween and this resonation cancels the torsional vibration of the crankshaft 150, so that the vibration of the crankshaft 150 is damped. The natural frequency of the damper pulley 2 corresponds to the frequency of torsional vibration of the crankshaft 150.

An attachment portion 22b is integrally formed on the damper mass 22. A balance piece 5, which will be described later, is attached to the attachment portion 22b. The attachment portion 22b protrudes from the damper mass 22 to the front (i.e., to the side opposite from where the boss 24 is located). The attachment portion 22b is a generally square cross section and is annular, extending along the circumference of the damper mass 22. The edges of the attachment portion 22b are rounded. In the outer surface of the damper mass 22, a concave portion 22c is formed at the root of the attachment portion 22b. The concave portion 22c has a semi-circular cross section and extends in the circumferential direction of the damper mass 22. An upper edge 52b of a clip portion 52 of the balance piece 5 is hooked to the concave portion 22c (See FIG. 9), as will be described in detail later.

(Balance Piece)

Figure 4A:
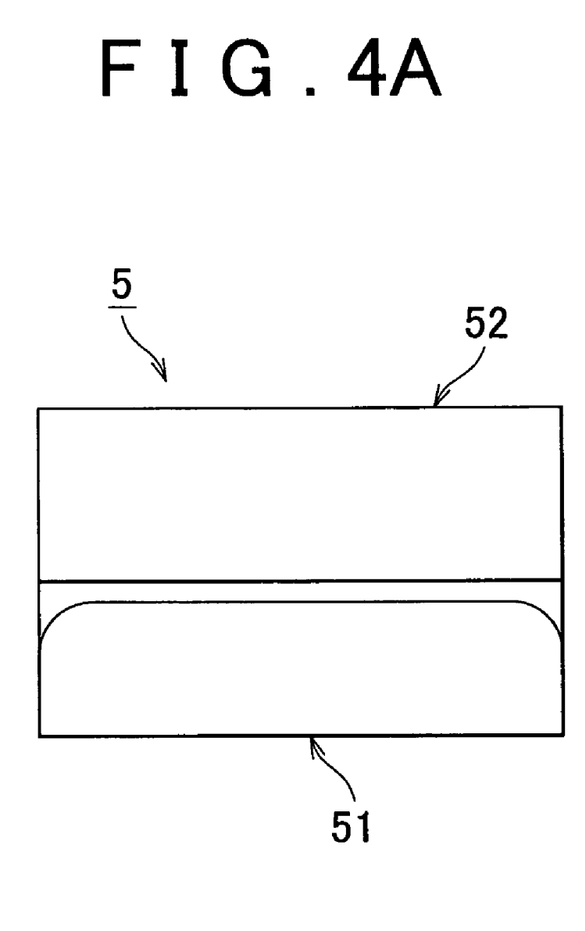
FIG. 4A is a front view of the balance piece in the first exemplary embodiment of the invention.
Figure 4B:
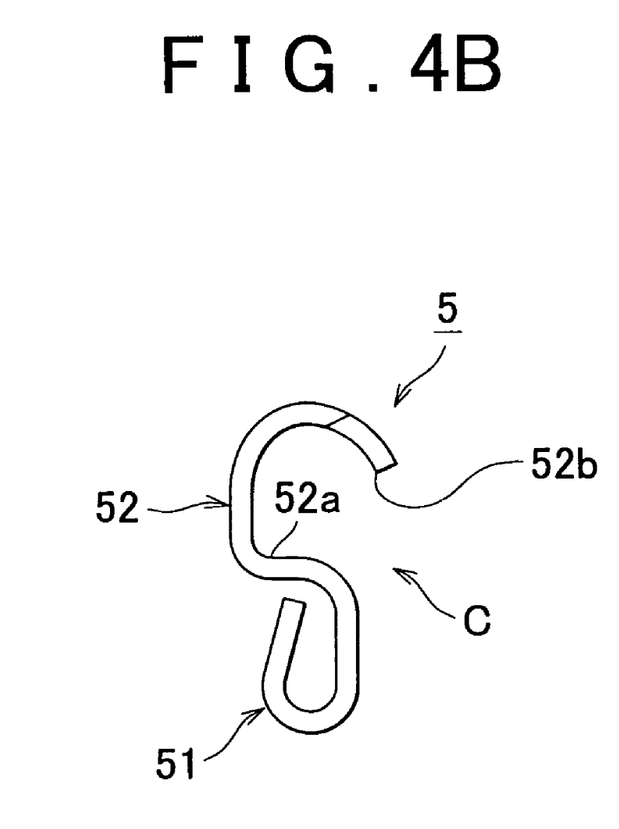
FIG. 4B is a side view of the balance piece in the first exemplary embodiment of the invention.
Figure 5:
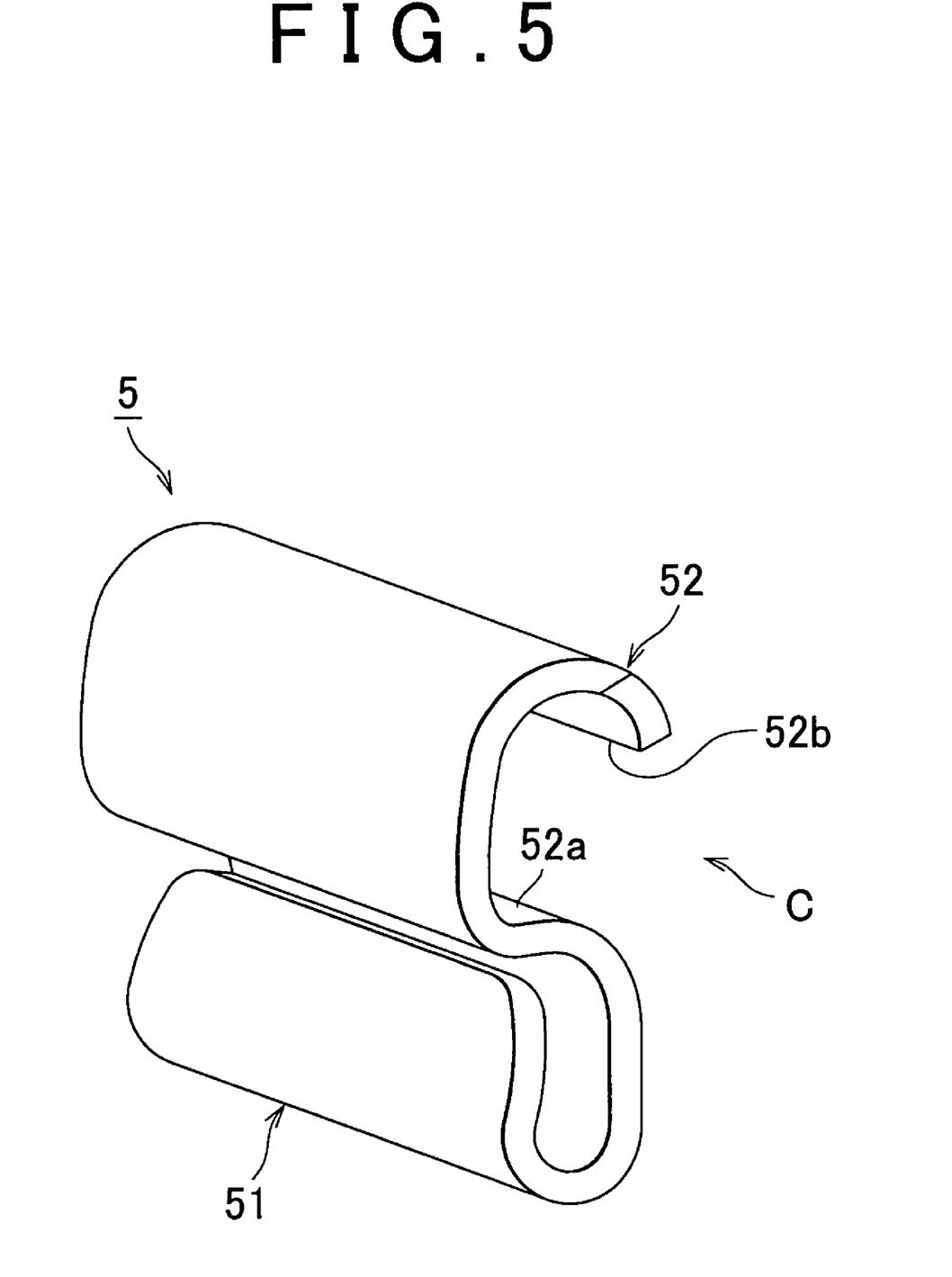
FIG. 5 is a perspective view of the balance piece shown in FIG. 4A and FIG. 4B.

FIG. 4A is a front view of the balance piece 5 for adjusting the rotational balance of the engine assembly A, and FIG. 4B is a side view of the balance piece 5 for adjusting the rotational balance of the engine assembly A. FIG. 5 is a perspective view of the balance piece 5.

In the first exemplary embodiment, the balance piece 5 is manufactured by pressing a steel plate (e.g., tool steel plate) into a specific form. The balance piece 5 has an weight portion 51 and the foregoing clip portion 52. The weight portion 51 is rolled into a generally rectangular shape as viewed from the side. The clip portion 52 has a clip gap C into which the attachment portion 22b of the damper mass 22 (See FIG. 3 and FIG. 6) is fit. Note that the clip portion 52 serves also as a balance weight.

Figure 7:
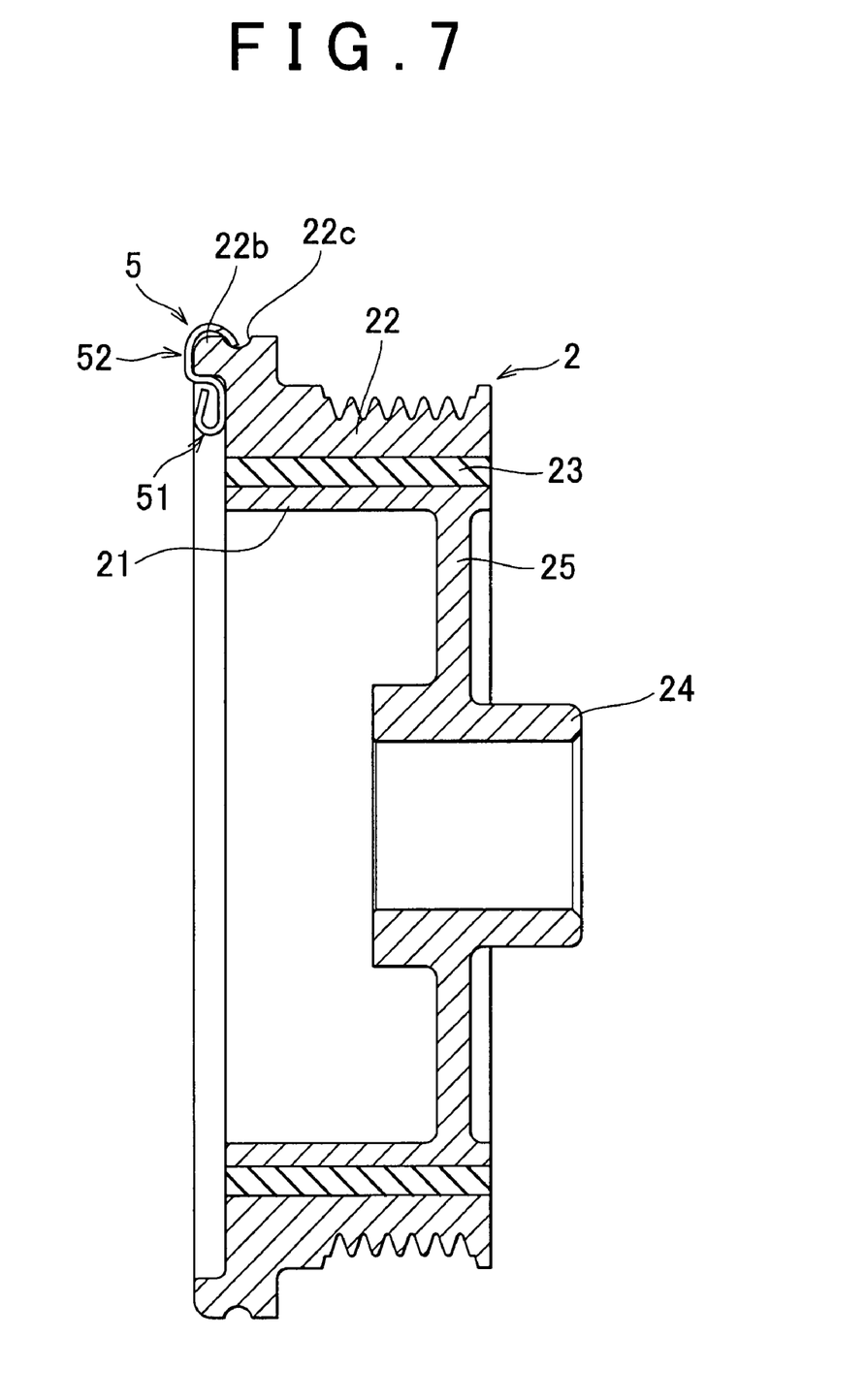
FIG. 7 is a vertical cross-sectional view showing the damper pulley and the balance piece attached thereon in the first exemplary embodiment of the invention.

Referring to FIG. 6, when attaching the above-described balance piece 5 to the damper pulley 2, the balance piece 5 is first put on the attachment portion 22b on the circumference of the damper mass 22 such that the attachment portion 22b faces the clip gap C, and then the center (i.e., the lateral center) of the clip portion 52 is tapped using a plastic hummer H, so that the clip portion 52 snaps on the attachment portion 22b (See FIG. 7). As such, the balance piece 5 is attached to the damper pulley 2. The balance piece 5 is attached to an arbitrary position on the circumference of the annular attachment portion 22b of the damper mass 22 based on the result of unbalance measurement, which will be described later.

Figure 8:
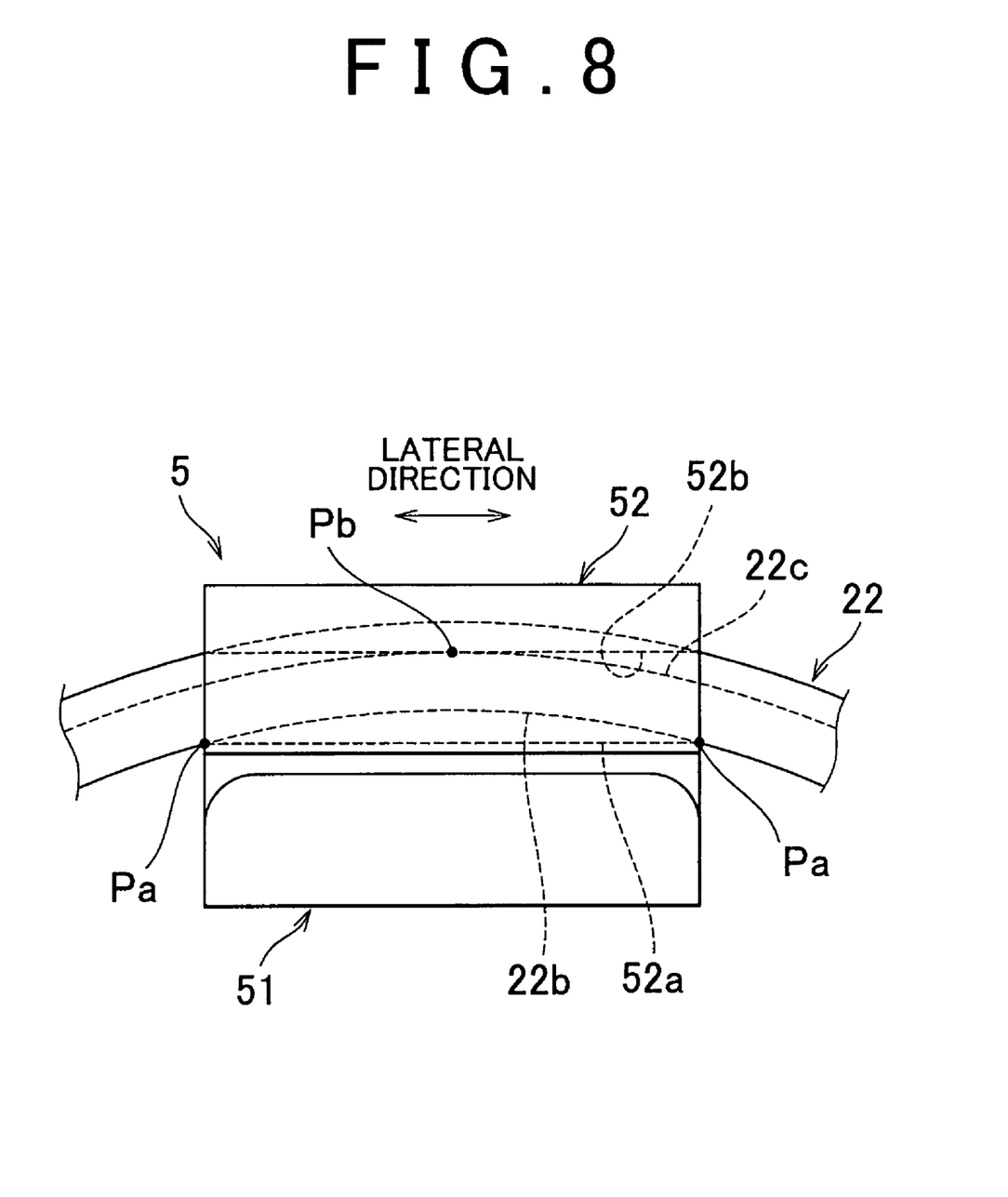
FIG. 8 is a view illustrating the effect of the balance piece in the first exemplary embodiment of the invention.
Figure 9:
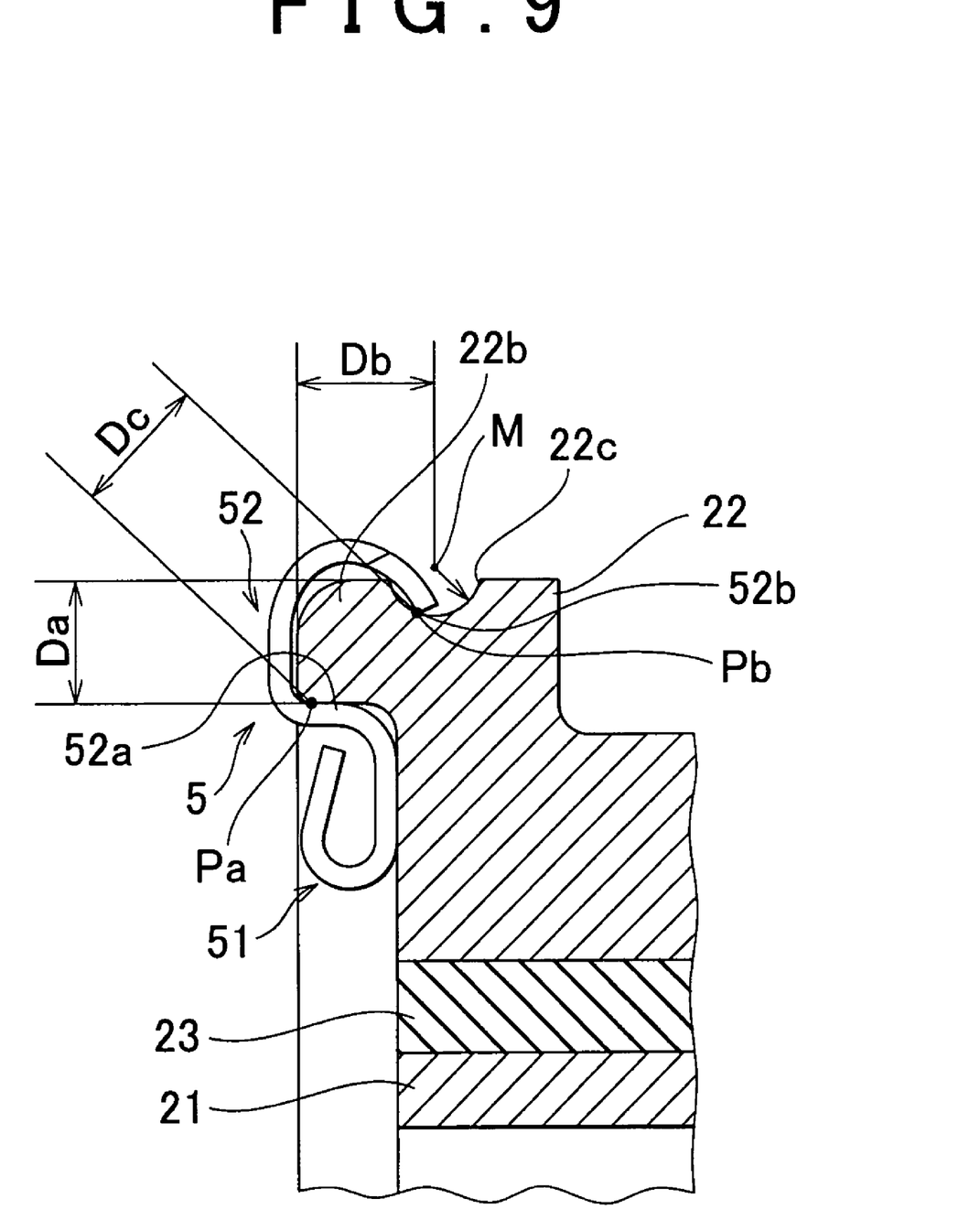
FIG. 9 is a view illustrating the dimensional relations between the clip gap of the balance piece and the attachment portion of the damper pulley in the first exemplary embodiment of the invention.

Referring to FIG. 8 and FIG. 9, the upper edge 52b and a lower edge 52a of the clip portion 52 extend straight, rather than curving with the curvature equal to the curvature of the damper mass 22. As such, when the clip portion 52 is attached on the attachment portion 22b, the center (lateral center) of the upper edge 52b of the clip portion 52 is in contact with the inner surface of the concave portion 22c formed in the outer surface of the damper mass 22 (single-point contact at point Pd), while both ends of the lower edge 52a of the clip portion 52 are in contact with the edge of the attachment portion 22b (two-point contact at points Pa). That is, when the balance piece 5 is attached on the damper mass 22, the balance piece 5 is always supported at the three points. Therefore, the damper mass 22 is retained on the damper mass 22 in an appropriate position, and thus a sufficient clip force (gripping force) is reliably obtained.

Next, a description will be made of the relation between the shape and the dimensions of the attachment portion 22b of the damper mass 22 and the clip gap C of the clip portion 52. Referring to FIG. 9, the dimensions of the respective portions of the attachment portion 22b of the damper mass 22 and the size of the clip gap C are determined such that each of the dimensional ratios [Da/Dc], [Db/Dc], and [Da/Db] is in the range of 0.5 to 1.5, where "Da" represents the distance between the point Pa, which is the contact point between the lower edge 52a of the clip portion 52 and the attachment portion 22b, and the outer surface (upper end) of the damper mass 22 (First distance), "Db" represents the distance between the center M of the concave portion 22c of the damper mass 22 and the front surface (front end face) of the attachment portion 22b (Second distance), and "Dc" represents the size of the clip gap C of the clip portion 52 (Third distance). That is, the three dimensional ratios are set to values that are close to each other. According to this structure, the gripping force of the balance piece 5 can be made high enough to prevent the balance piece 5 from coming off from the attachment portion 22b of the damper mass 22 while maintaining the ease of attaching the balance piece 5 to the damper mass 22.

(Method for Adjusting Rotational Balance)

In the first exemplary embodiment, the engine assembly A is first assembled by attaching the damper pulley 2 and the flywheel 3 (and other rotational parts, such as crank rotor and drive plate, if applicable) to the crankshaft 150 of the engine body 1, and then the rotational balance of a rotational-part assembly consisting of a plurality of parts including the damper pulley 2, the flywheel 3, and the crankshaft 150 is adjusted.

More specifically, when adjusting the rotational balance, the engine assembly A is first set on a balancer machine, and then the amount of unbalance and the direction of unbalance are measured while rotating the crankshaft 150. If the rotational-part assembly is out of balance, the balance piece 5 is attached to the damper mass 22 of the damper pulley in accordance with the measured unbalance amount and unbalance direction. When attaching the balance piece 5, as described above and as shown in FIG. 6, the balance piece 5 is first put on the attachment portion 22b on the circumference of the damper mass 22 such that the attachment portion 22b faces the clip gap C of the clip portion 52 of the balance piece 5, and then the center of the clip portion 52 is tapped using a plastic hummer H, so that the clip portion 52 snaps on the attachment portion 22b.

Thus, in this first exemplary embodiment, as described above, the engine assembly A is first assembled by mounting the parts including the damper pulley 2 to the engine body 1 and then the rotational balance of the parts mounted on the engine assembly is adjusted by attaching the balance piece 5 to the damper mass 22 of the damper pulley 2. That is, in the first exemplary embodiment, because the rotational balance of the rotational-part assembly consisting of the crankshaft 150, the damper pulley 2, the flywheel 3, and the crank sprocket 4, and so on, is adjusted, it is not necessary to finely adjust the rotational balance of each part. Further, because the balance piece 5 is attached to the damper mass 22 that is provided on the outer periphery of the damper rubber 23, the impact force that arises when attaching the balance piece 5 to the damper mass 22 (i.e., the impact force from the plastic hummer) can be absorbed by the damper rubber 23, and this eliminates the possibility of the respective parts of the engine body 1 being damaged when attaching the balance piece 5.

2. Second Exemplary Embodiment

Figure 10A:
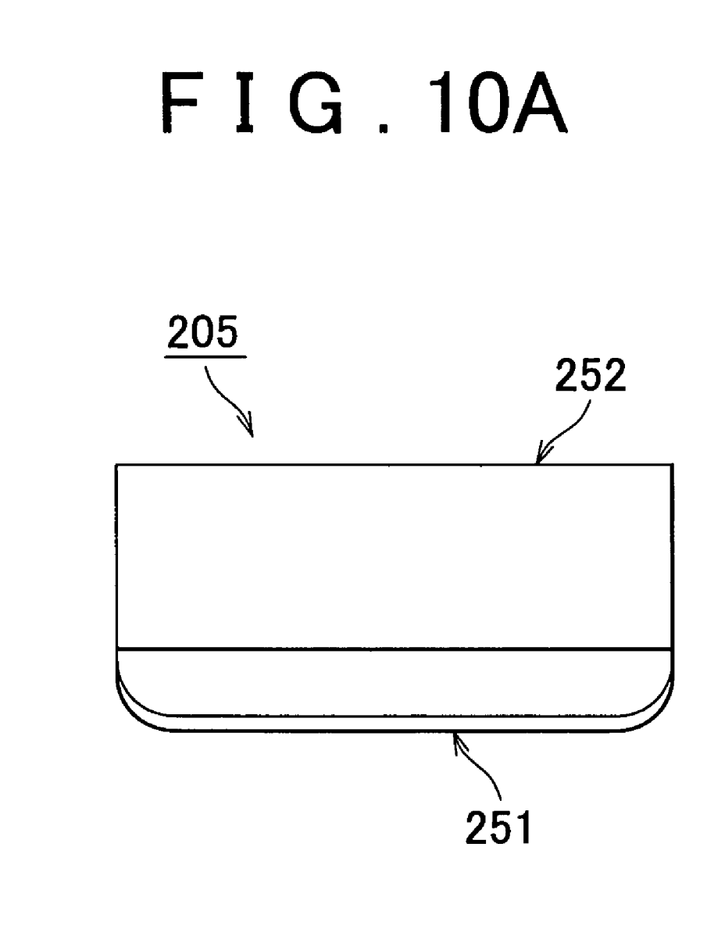
FIG. 10A is a front view of the balance piece in the second exemplary embodiment of the invention.
Figure 10B:
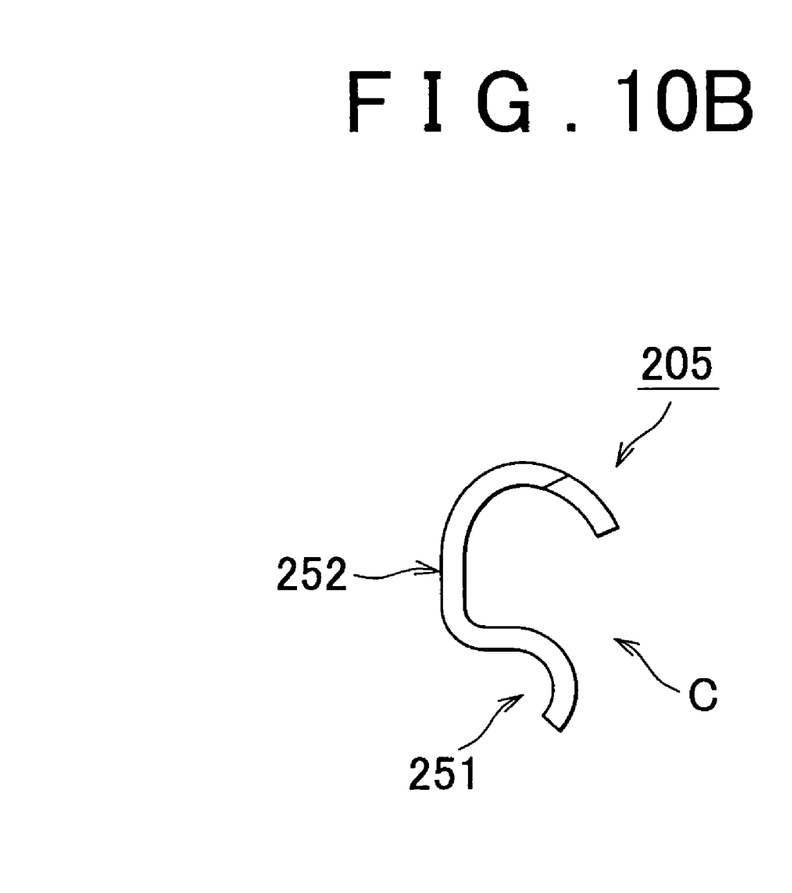
FIG. 10B is a side view of the balance piece in the second exemplary embodiment of the invention.
Figure 11:
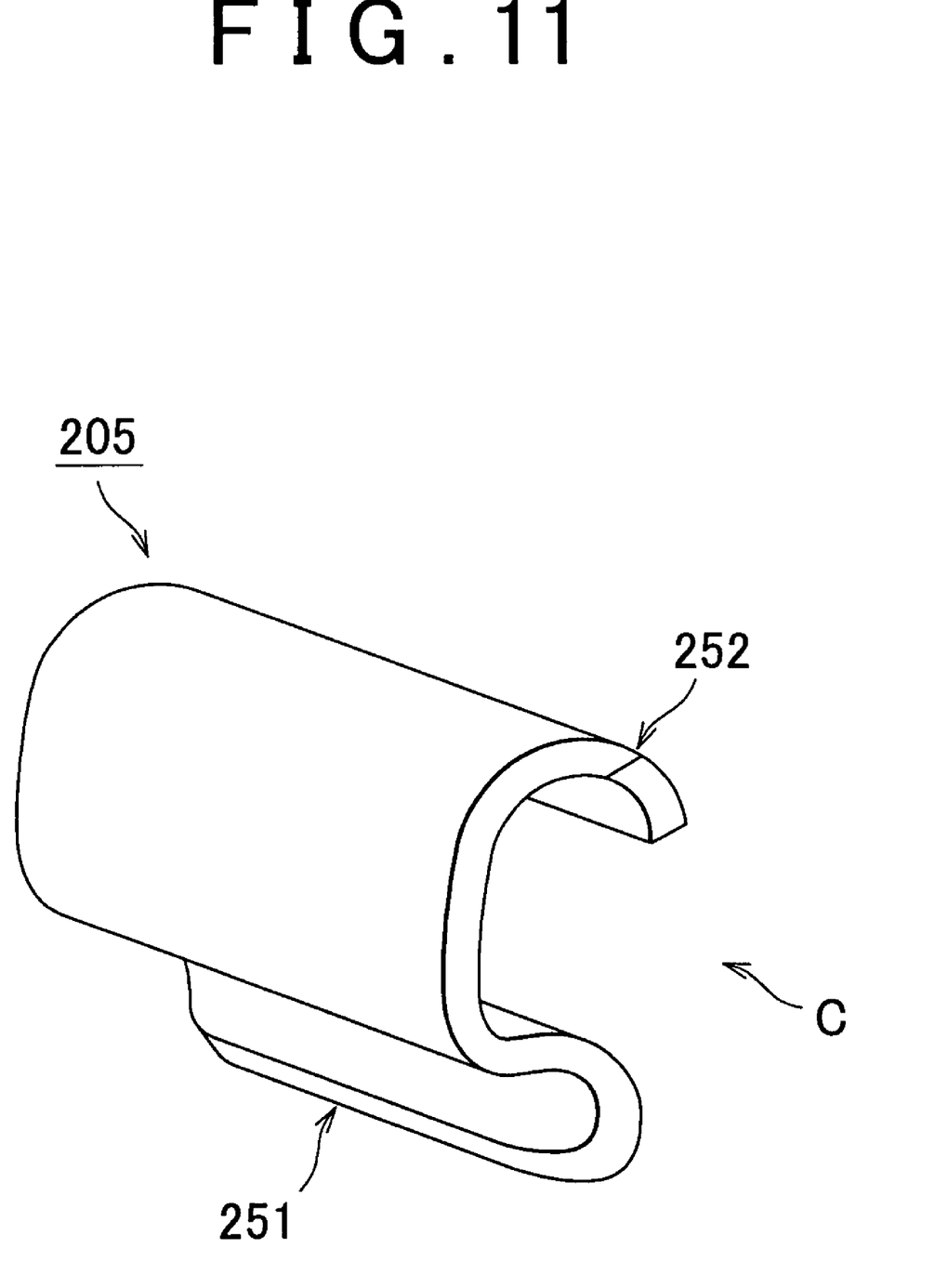
FIG. 11 is a perspective view of the balance piece shown in FIG. 10A and FIG. 10B.

FIG. 10A is a front view of a balance piece 205 used in the second exemplary embodiment of the invention and FIG. 10B is a side view of the balance piece 205 used in the second exemplary embodiment of the invention. FIG. 11 is a perspective view of the balance piece 205.

An weight portion 251 of the balance piece 205 of the second exemplary embodiment is smaller than that of the balance piece 5 shown in FIG. 4A, FIG. 4B, and FIG. 5, and therefore the mass of the balance piece 205 is relatively small. Other structures of the balance piece 205 (i.e., the structures of the respective portions of the clip portion 252) are the same as those of the balance piece 5 shown in FIG. 4A, FIG. 4B, and FIG. 5.

When attaching the balance piece 205 to the damper pulley 2, as in the second exemplary embodiment, the balance piece 205 is first put on the attachment portion 22b on the circumference of the damper mass 22 such that the attachment portion 22b faces the clip gap C of the clip portion 252 of the balance piece 205, and then the center of the clip portion 252 is tapped using the plastic hummer H, or the like, so that the clip portion 252 snaps on the attachment portion 22b.

Then, the rotational balance is adjusted by using the balance piece 205 described above and the balance piece 5 shown in FIG. 4A, FIG. 4B, and FIG. 5. Using the two types of balance pieces having different masses in combination, it is possible to make finer adjustments of the rotational balance of the rotational-part assembly consisting of a plurality of parts including the crankshaft 150, the damper pulley 2, the flywheel 3, and the crank sprocket 4. Note that the rotational balance of the rotational-part assembly may be adjusted using three or more types of balance pieces having different masses in combination.

Meanwhile, in the exemplary embodiments described above, each of the balance pieces 5, 205 is formed in a straight shape in the lateral direction, rather than a shape curved with the curvature equal to or corresponding to the curvature of the damper mass 22 of the damper pulley 2. However, balance pieces curved with the curvature equal to the curvature of the damper mass 22 may alternatively be used to adjust the rotational balance.

Further, while the balance pieces 5, 205 are attached to the damper mass 22 by being tapped by the hummer in the exemplary embodiments described above, the balance pieces 5, 205 may be attached to the damper mass 22 using a jig.

3. Third Exemplary Embodiment

According to the invention, regarding the structure of the damper pulley attached to the crankshaft 150, any damper pulley may be used provided that it has a damper rubber and a damper mass provided on the outer periphery of the damper rubber. For example, a damper pulley 302 according to the third exemplary embodiment of the invention may be used, as will be described below with reference to FIG. 12.

Figure 12:
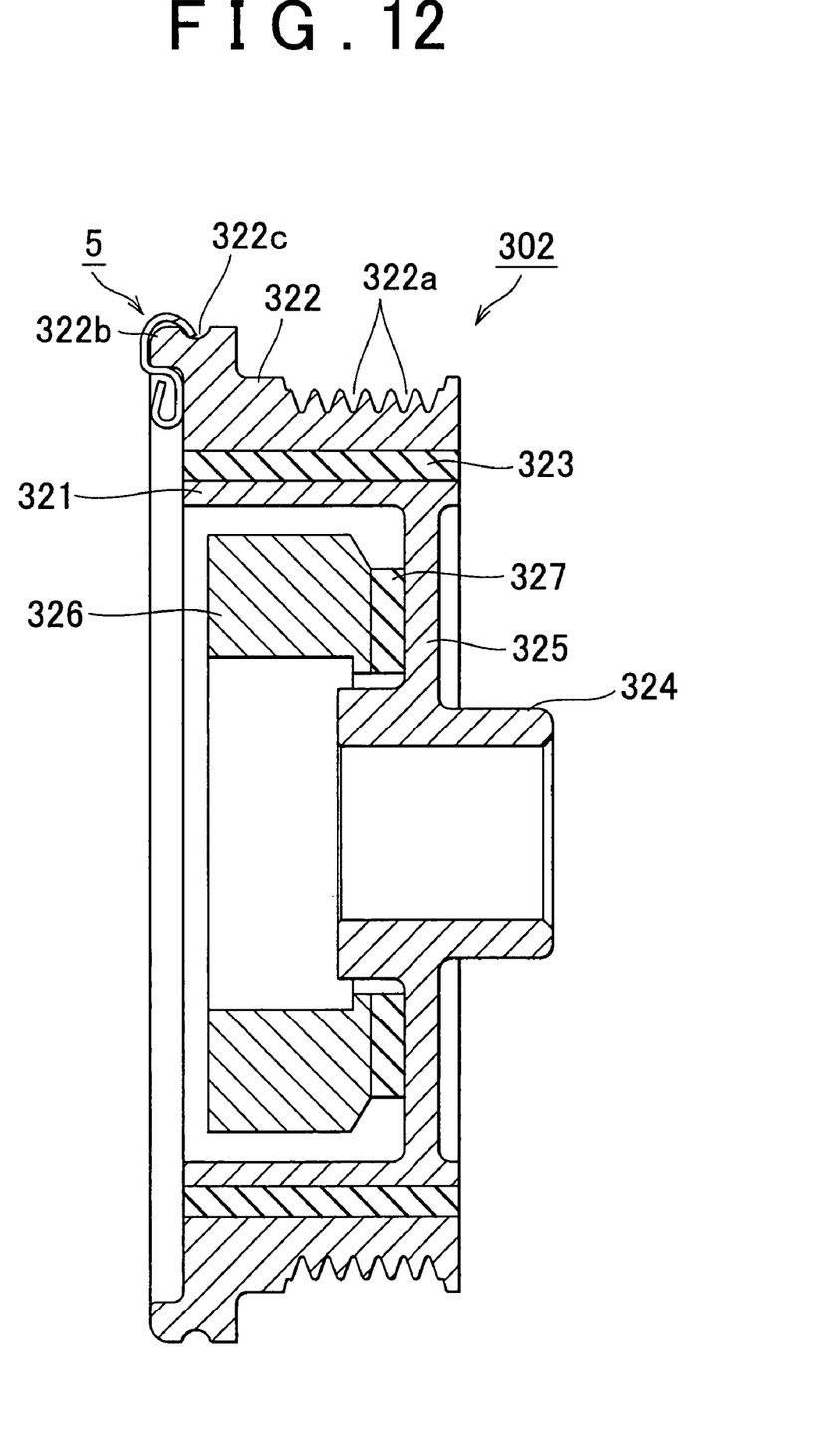
FIG. 12 is a vertical cross-sectional view showing an exemplary structure of the damper pulley in the third exemplary embodiment of the invention.

Referring to FIG. 12, the damper pulley 302 is a dual type damper pulley that includes a cylindrical hub 321, a boss 324 that is connected to the hub 321 via arms 325, a damper rubber 323 provided on the outer periphery of the hub 321, and a cylindrical outer damper mass 322 which is provided on the outer periphery of the damper rubber 323 and in the outer surface of which V-grooves 322a are formed, and a cylindrical inner damper mass 326 provided in the inside of the hub 321, and a damper rubber 327 provided between the arms 325 and the inner damper mass 326. The hub 321, the boss 324, and the arms 325 are integrally formed. The hub 321, the outer damper mass 322, and the inner damper mass 326 are made of cast-iron, for example.

The damper pulley 302 shown in FIG. 12 has an attachment portion 322b and a concave portion 322 having the same shapes as the attachment portion and the concave portion of the damper pulley 2 shown in FIG. 3. The balance piece 5 shown in FIG. 4A, FIG. 4B, and FIG. 5 is attached to the damper mass 322 by being tapped by a hummer, or the like.

While the invention has been applied to a V-eight engine for motor vehicles in the exemplary embodiments described above, the invention is not limited to such applications, but may also be applied to adjust the rotational balance of other types of engines, such as inline cylinder engines for motor vehicles, boxer engines for motor vehicles, and engines for applications other than motor vehicles. Also, the number of cylinders, the angle between the cylinders in the left and right banks of a V8 engine, and any other engine specifications are not limited to those employed in the exemplary embodiments described above.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A rotational balance adjustment structure for an engine, comprising:
    a damper pulley having an elastic member provided on the outer periphery of a hub and a damper mass provided on the outer periphery of the elastic member;
    an engine assembly having an engine body and a plurality of parts mounted on the engine body, the plurality of parts including the damper pulley; and
    a balance piece that is detachably attached to the damper mass to adjust the rotation balance of the engine assembly.

2. The rotational balance adjustment structure according to claim 1, wherein:
    the damper mass has an attachment portion to which the balance piece is attached;
    the attachment portion is provided at a portion of the damper mass in the side opposite from where the engine body is located and is formed in such a shape that the attachment portion can be fit into the balance piece.

3. The rotational balance adjustment structure according to claim 2, wherein
    the attachment portion is annular, extending along the circumference of a portion of the damper mass on the side opposite from where the engine body is located.

4. The rotational balance adjustment structure according to claim 2, wherein:
    a concave portion to which the balance piece is hooked is formed in the attachment portion.

5. The rotational balance adjustment structure according to claim 2, wherein:
    the balance piece has a clip portion into which the attachment portion is fit and an weight portion that serves as a balance weight, the clip portion and the weight portion being integrally formed.

6. The rotational balance adjustment structure according to claim 1, wherein:
    the balance piece is provided in plurality, and
    each of the balance pieces has a different mass.

7. The rotational balance adjustment structure according to claim 4, wherein:
    the distance between the upper end of the attachment portion and a contact point between a lower edge of the clip portion and the attachment portion is a first distance;
    the distance between the center of the concave portion and the front end face of the attachment portion is a second distance,
    the distance between one side of a clip gap of the clip portion and the other side of the clip gap is a third distance, and
    the ratio between the first distance and the third distance, the ratio between the second distance and the third distance, and the ratio between the first distance and the second distance are in the range of 0.5 to 1.5.

8. A rotational balance adjusting method for an engine, wherein:
    assembling an engine assembled by mounting a plurality of parts to an engine body, the plurality of parts including a damper pulley having an elastic member provided on the outer periphery of a hub and a damper mass provided on the outer periphery of the elastic member; and
    adjusting the rotational balance of the engine assembly by attaching a balance piece to the damper mass.

9. The rotational balance adjusting method according to claim 8, wherein:
    the rotational balance of the engine assembly is adjusted by attaching a plurality of balance pieces having different masses to the damper mass.

* * * * *